(12) United States Patent
Huh et al.

(10) Patent No.: US 11,837,778 B2
(45) Date of Patent: Dec. 5, 2023

(54) ANTENNA STRUCTURE AND IMAGE DISPLAY DEVICE INCLUDING THE SAME

(71) Applicant: DONGWOO FINE-CHEM CO., LTD., Jeollabuk-do (KR)

(72) Inventors: Yoon Ho Huh, Seoul (KR); Young Su Lee, Gyeonggi-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/553,943

(22) Filed: Dec. 17, 2021

(65) Prior Publication Data

US 2022/0197080 A1 Jun. 23, 2022

(30) Foreign Application Priority Data

Dec. 17, 2020 (KR) .................... 10-2020-0177293

(51) Int. Cl.
*G02F 1/1335* (2006.01)
*H01Q 1/24* (2006.01)
*H01Q 1/38* (2006.01)

(52) U.S. Cl.
CPC ....... *H01Q 1/243* (2013.01); *G02F 1/133512* (2013.01); *H01Q 1/38* (2013.01)

(58) Field of Classification Search
None
See application file for complete search history.

(56) References Cited

U.S. PATENT DOCUMENTS

| | | | |
|---|---|---|---|
| 2018/0188432 A1* | 7/2018 | Choi | H01L 51/5281 |
| 2021/0103041 A1* | 4/2021 | Katoh | G01S 7/499 |
| 2022/0320709 A1* | 10/2022 | Yu | H01Q 1/243 |
| 2022/0344813 A1* | 10/2022 | Uejima | H01Q 5/40 |

FOREIGN PATENT DOCUMENTS

| | | | |
|---|---|---|---|
| JP | 2000138512 A | * | 5/2000 |
| KR | 10-2013-0113222 A | | 10/2013 |

* cited by examiner

*Primary Examiner* — Shan Liu
(74) *Attorney, Agent, or Firm* — The PL Law Group, PLLC

(57) ABSTRACT

An antenna structure according to an embodiment of the present disclosure includes a support layer having a first surface and a second surface facing each other, a light-shielding pattern disposed on a peripheral portion of the first surface of the support layer, a radiator disposed at the same level as that of the light-shielding pattern on the first surface of the support layer, and a signal pad disposed on the light-shielding pattern and electrically connected to the radiator. A spatial efficiency of the antenna structure may be improved and a thickness of the image display device may be reduced to enhance a bending property.

13 Claims, 3 Drawing Sheets

ANTENNA STRUCTURE AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2020-0177293 filed on Dec. 17, 2020 in the Korean Intellectual Property Office (KIPO), the entire disclosures of which are incorporated by reference herein.

BACKGROUND

1. Field

The present invention relates to an antenna structure and an image display device including the same. More particularly, the present invention relates to an antenna structure including an antenna unit and a light-shielding pattern, and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

Recently, as a bendable image display device such as flexible display, demands for the antenna capable of being applied to the flexible display are increasing.

However, when an additional film or structure is formed for the introduction of the antenna, an overall thickness of the flexible display may be increased, or a laminating structure for folding the flexible display may be changed. Accordingly, desirable folding or bending properties of the flexible display may be degraded.

Thus, a construction for introducing the antenna in a limited space while achieving sufficient radiation and gain properties of the antenna is required.

For example, Korean Published Patent Application No. 2013-0113222 discloses an antenna integrated into a mobile terminal, but does not sufficiently consider the antenna construction as described above.

SUMMARY

According to an aspect of the present invention, there is provided an antenna structure having improved spatial efficiency and reliability.

According to an aspect of the present invention, there is provided an image display device including an antenna structure with improved spatial efficiency and reliability.

(1) An antenna structure, including: a support layer having a first surface and a second surface facing each other; a light-shielding pattern disposed on a peripheral portion of the first surface of the support layer; a radiator disposed at the same level as that of the light-shielding pattern on the first surface of the support layer; and a signal pad disposed on the light-shielding pattern and electrically connected to the radiator.

(2) The antenna structure of the above (1), wherein the signal pad is in contact with a top surface of the light-shielding pattern, and the radiator is in contact with the first surface of the support layer.

(3) The antenna structure according to the above (1), wherein a step difference is generated between a top surface of the signal pad and a top surface of the radiator.

(4) The antenna structure of the above (3), further including a transmission line electrically connecting the signal pad and the radiator with each other.

(5) The antenna structure of the above (4), wherein the transmission line is bent along a sidewall of the light-shielding pattern and the first surface of the support layer.

(6) The antenna structure of the above (1), further including a passivation layer formed on the first surface of the support layer to cover the radiator and at least partially expose a top surface of the signal pad.

(7) The antenna structure of the above (1), wherein the radiator has a mesh structure, and the signal pad has a solid metal pattern.

(8) The antenna structure of the above (1), further including a transparent film formed on the second surface of the support layer.

(9) The antenna structure of the above (1), wherein the support layer includes a first intermediate layer including the first surface and a second intermediate layer including the second surface, and the first intermediate layer and the second intermediate layer include different dielectric materials.

(10) An image display device, including: a display panel; and the antenna structure according to embodiments as described above disposed on the display panel.

(11) The image display device of the above (10), further including a ground layer disposed under the display panel.

(12) The image display device of the above (10), further including a cover window disposed on the antenna structure, wherein the second surface of the support layer of the antenna structure is disposed toward the cover window.

(13) The image display device of the above (12), further including: a first adhesive layer disposed between the antenna structure and the display panel; and a circuit board disposed between the light-shielding pattern of the antenna structure and the first adhesive layer to be bonded to the signal pad.

(14) The image display device of the above (13), further including a second adhesive layer disposed between the antenna structure and the cover window.

(15) The image display device of the above (14), wherein a thickness of the first adhesive layer is from 50 µm to 500 µm, and a thickness of the second adhesive layer is from 20 µm to 200 µm.

(16) The image display device of the above (13), further including an optical layer disposed between the first adhesive layer and the display panel.

According to embodiments of the present invention, an antenna structure may include a support layer, a light-shielding film disposed on the support layer, and an antenna unit including a radiator formed at the same layer as that of the light-shielding film and a signal pad formed on the light-shielding film. Thus, the antenna unit may be included at the same level as that of a light-shielding pattern of the image display device without adding an antenna substrate layer to the antenna structure.

Accordingly, a total thickness of the image display device including the antenna structure may not be increased, and a neutral plane for a smooth folding of the image display device may be maintained. Thus, flexible properties and mechanical durability may be enhanced while maintaining the antenna radiation performance, so that the image display device having high reliability including an antenna may be implemented.

A first adhesive layer may be disposed between the antenna structure and a display panel of the image display device. A thickness of the first adhesive layer may be within a predetermined range. Accordingly, excessive absorption of a signal radiated from the antenna unit by a ground layer and/or a conductive member of the display panel may be prevented, and a circuit board may be stably disposed.

In some embodiments, a ground layer may be disposed under a display panel included in the image display device. In this case, the conductive member and the ground layer of the display panel may be provided together as a ground of the antenna unit. Accordingly, a vertical radiation property of the antenna unit may be implemented with high efficiency and high reliability.

DETAILED DESCRIPTION OF THE EMBODIMENTS

According to exemplary embodiments of the present invention, there is provided an antenna structure including a light-shielding pattern and an antenna unit.

The antenna structure may include, e.g., a microstrip patch antenna fabricated in the form of a transparent film., a monopole antenna or a dipole antenna. The antenna structure may be applied to communication devices for a mobile communication of a high or ultrahigh frequency band corresponding to a mobile communication of, e.g., 3G, 4G, 5G or higher.

According to exemplary embodiments of the present invention, there is also provided an image display device including the antenna structure. An application of the antenna structure is not limited to the image display device, and the antenna structure may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "upper", "lower", "top", "bottom", "front", "rear", etc., used herein do not designate an absolute position, but are relatively used to distinguish different elements or different positions.

Figure 1:
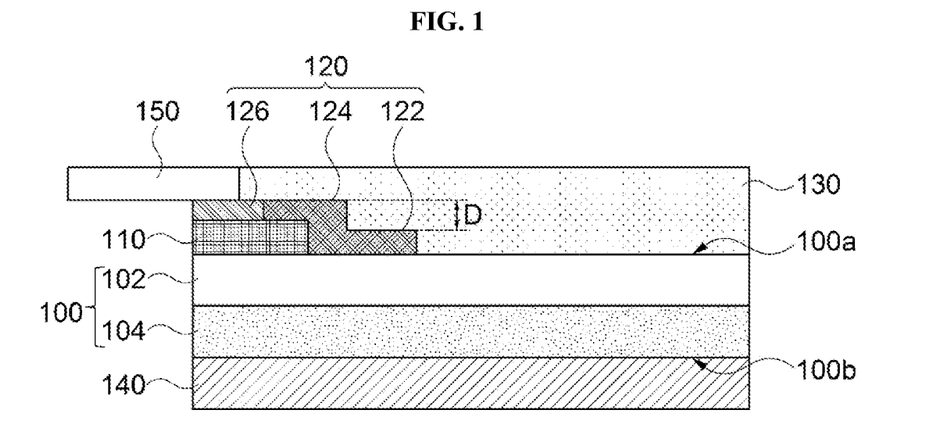
FIG. 1 is a schematic cross-sectional view illustrating an antenna structure in accordance with exemplary embodiments.

FIG. 1 is a schematic cross-sectional view illustrating an antenna structure in accordance with exemplary embodiments.

Referring to FIG. 1, the antenna structure may include a support layer 100 having a first surface 100a and a second surface 100b facing each other, a light-shielding pattern 110 disposed on the first surface 100a of the support layer 100, and an antenna unit 120 adjacent to the light-shielding pattern 110.

The support layer 100 may serve as, e.g., a protective layer of a transparent film 140 as will be described later and/or a base layer of the antenna unit 120. In this case, an additional substrate for the antenna unit 120 may not be inserted. Accordingly, a thickness and/or volume of the antenna structure may be reduced. Thus, a spatial efficiency of the antenna structure may be increased, and flexible property, durability, and driving reliability may also be improved.

The support layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA) or an optically clear resin (OCR) may be included in the support layer 110. In some embodiments, the support layer 110 may include an inorganic insulating material such as silicon oxide, silicon nitride, silicon oxynitride, glass, or the like.

In some embodiments, a dielectric constant of the support layer 110 may be adjusted in a range from about 1.5 to about 12. When the dielectric constant exceeds about 12, a driving frequency may be excessively decreased, so that driving in a desired high or ultra-high frequency band may not be implemented.

In exemplary embodiments, the support layer 100 may include a first intermediate layer 102 including the first surface 100a and a second intermediate layer 104 including the second surface 100b.

For example, the first intermediate layer 102 may serve as a protective layer capable of protecting the antenna unit 120 and the light-shielding pattern 110 from an external impact during a laminating process of the antenna structure. The first intermediate layer 102 may include a material selected from materials capable of serving as a protective layer such as, e.g., the organic and/or inorganic insulating material as mentioned above.

For example, the second intermediate layer 104 may serve as a separation adhesive layer for attaching a carrier substrate on the second surface 100b of the support layer 100 during the lamination process of the antenna structure. For example, the transparent film 140 may be attached on the second surface 100b of the support layer 100 after peeling off the carrier substrate. The second intermediate layer 104 may include a material in consideration of easily performing the attachment/detachment, and may include, e.g., the organic insulating material as mentioned above.

In some embodiments, the first intermediate layer 102 and the second intermediate layer 104 may include different dielectric materials in consideration of the function of each layer. Accordingly, the support layer 100 may serve as both the protective layer and the separation adhesive layer.

In some embodiments, a total thickness of the support layer 100 may be 5 μm or less. In this case, the antenna unit 120 may be disposed on a substrate having a relatively thin thickness. Accordingly, the thickness of the antenna structure may be reduced compared to the case of inserting a separate antenna base layer.

In exemplary embodiments, the light-shielding pattern 110 may be disposed on a peripheral portion (e.g., an edge portion) of the first surface 100a of the support layer 100.

For example, the support layer 100 may include a central portion positioned at a display area of an image display device as will be described later, and a peripheral portion positioned at a non-display area of the image display device. The light-shielding pattern 110 may be disposed on the peripheral portion of the first surface 100a of the support layer 100. Accordingly, an opaque conductive wiring pattern and various circuits existing in the non-display area may be shielded by the light-shielding pattern 110, and may not be recognized by a user.

For example, the light-shielding pattern 110 may be used as a black matrix. For example, the light-shielding pattern 110 may include an opaque resin including a colorant. The colorant may include carbon black, a pigment mixed with a silver-tin-containing alloy or a combination thereof.

For example, an arbitrary pattern or design may be included on one surface of the light-shielding pattern 110. For example, an arbitrary pattern or design may be included on one surface of the light-shielding pattern 110 disposed toward a viewer side of the image display device. Accordingly, aesthetic property of the antenna structure or the image display device may be optionally added by forming the appropriate pattern or design.

In exemplary embodiments, the antenna unit 120 may include a radiator 122 disposed at the same level as that of the light-shielding pattern 110 on the first surface 100a of the support layer 100 and a signal pad 126 disposed on the light-shielding pattern 110 to be electrically connected to the radiator 122.

Accordingly, a visual recognition of the signal pad 126 may be avoided at the user's viewing side of the image display device and thus deterioration of an image quality may be prevented.

For example, the signal pad 126 of the antenna unit 120 may contact a top surface of the light-shielding pattern 110, and the radiator 122 may contact the first surface 100a of the support layer 100.

In some embodiments, the light-shielding pattern 110 may be disposed under the signal pad 126 to generate a step D between the top surface of the signal pad 126 and the top surface of the radiator 122. Thus, a pressure applied when the circuit board 150 is bonded to the signal pad 126 may be partially buffered to suppress cracks that may occur during the bonding process.

In exemplary embodiments, the antenna unit 120 may further include a transmission line 124 electrically connecting the signal pad 126 and the radiator 122 with each other.

For example, the transmission line 124 may be bent along a sidewall of the light-shielding pattern 110 and the first surface 100a of the support layer 100 to connect the signal pad 126 and the radiator 122. Accordingly, the signal pad 126 and the radiator 122 may be electrically connected while maintaining the step difference D between the top surface of the signal pad 126 and the top surface of the radiator 122.

In exemplary embodiments, the antenna structure may further include a passivation layer 130 formed on the first surface 100a of the support layer 100 to cover the radiator 122. A top surface of the signal pad 126 may be at least partially exposed from the passivation layer 130.

For example, the passivation layer 130 may serve as an insulating layer that electrically separates the antenna unit 120 from other materials.

The passivation layer 130 may include, e.g., an organic insulating material such as an epoxy-based resin, an acrylic resin, a siloxane-based resin or a polyimide-based resin, or an inorganic insulating material such as silicon oxide or silicon nitride.

In some embodiments, a thickness of the passivation layer 130 may be 5 μm or less. Accordingly, the thickness of the antenna structure may become smaller compared to the case of inserting an additional antenna base layer.

In some embodiments, the passivation layer 130 may at least partially expose a top surface of the signal pad 126, and the circuit board 150 may be bonded and electrically connected to the exposed portion of the signal pad 126. The circuit board 150 may include, e.g., a flexible printed circuit board (FPCB).

For example, the circuit board 150 may extend to be electrically connected to a main board of the image display device. In this case, the antenna unit 120 and the antenna driving integrated circuit (IC) chip mounted on the main board may be electrically connected to each other. Accordingly, a power supply/control signal (e.g., a phase signal, a beam tilting signal, etc.) may be applied from the antenna driving IC chip to the antenna unit 120.

In exemplary embodiments, the antenna structure may include the transparent film 140 formed on the second surface 100b of the support layer 100.

The transparent film 140 may protecting the antenna unit 120 and the display panel of the image display device from, e.g., an external impact.

The transparent film 140 may include, e.g., at least one of the above-described transparent resin films. Preferably, the transparent film 140 may include polyethylene terephthalate.

Figure 2:
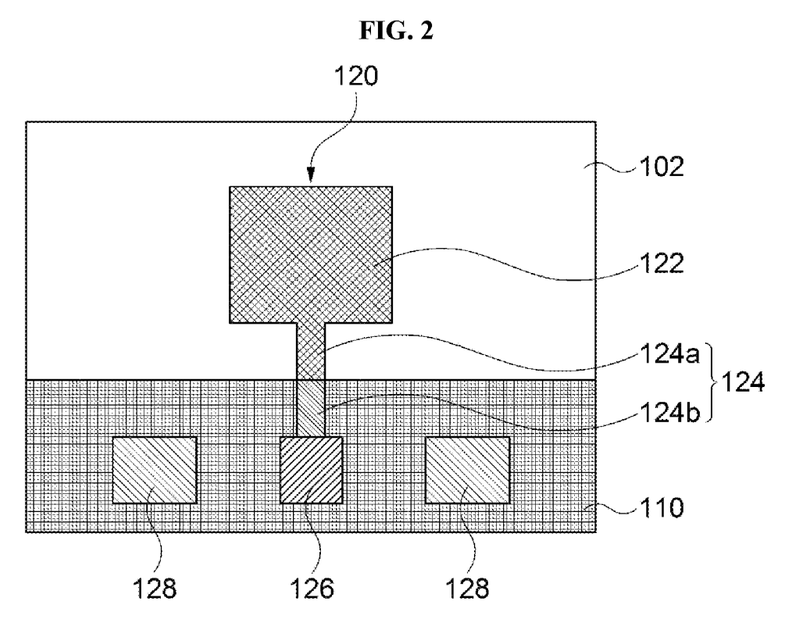
FIG. 2 is a schematic top planar view illustrating an antenna unit in accordance with exemplary embodiments.

FIG. 2 is a schematic top planar view illustrating an antenna unit in accordance with exemplary embodiments.

Referring to FIG. 2, the antenna unit 120 may be formed on the first surface 100a of the support layer and the light-shielding pattern 110. For example, the plurality of antenna units 120 may be arranged in an array form along the width direction of the support layer 100 or the antenna structure to form an antenna unit row.

As described above, the antenna unit 120 may include the radiator 122 and the transmission line 124. The radiator 122 may have, e.g., a polygonal plate shape, and the transmission line 124 may extend from one side of the radiator 122. The transmission line 124 may be formed as a single member substantially integral with the radiator 122, and may have a narrower width than that of the radiator 122.

The antenna unit 120 may further include a signal pad 126. The signal pad 126 may be connected to a terminal end portion of the transmission line 124. In an embodiment, the signal pad 126 may be provided as a member substantially integral with the transmission line 124, and the terminal end portion of the transmission line 124 may serve as the signal pad 126.

In some embodiments, a ground pad 128 may be disposed around the signal pad 126. For example, a pair of the ground pads 128 may be disposed to face each other with the signal pad 126 interposed therebetween. The ground pad 128 may be electrically and physically separated from the transmission line 124 and the signal pad 126.

In some embodiments, the transmission line 124 may extend over the first surface 100*a* of the support layer 100 and the light-shielding pattern 110.

For example, the transmission line 124 may include a first portion 124*a* connected to the radiator 122 and disposed on the first surface 100*a* of the support layer 100, and a second portion 124*b* connected to the signal pad 126 and disposed on the light-shielding pattern 110. Accordingly, the radiator 122 and the signal pad 126 may be electrically connected while generating the step difference D.

The antenna unit 120 or the radiator 122 may be designed to have, e.g., a resonance frequency corresponding to high frequency or ultra-high frequency band such as 3G, 4G, 5G or higher band. For example, the resonance frequency of the antenna unit may be about 10 GHz or more, or in a range from about 20 GHz to 45 GHz.

In some embodiments, the radiators 122 having different sizes may be arranged on the first surface 100*a* of the support layer 100. In this case, the antenna unit 120 may serve as a multi-radiation or multi-band antenna radiating at a plurality of resonance frequency bands.

The antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 120 may include a blackened portion, so that a reflectance at a surface of the antenna unit 120 may be decreased to suppress a visual recognition of the antenna unit due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the radiator 122 and the first portion 124*a* of the transmission line 124 may include a mesh-pattern structure to improve transmittance. In this case, a dummy mesh pattern (not illustrated) may be formed around the radiator 122 and the first portion 124*a* of the transmission line 124.

The signal pad 126, the ground pad 128 and the second portion 124*b* of the transmission line 124 may be formed as a solid pattern including the above-described metal or alloy in consideration of reduction of feeding resistance, noise absorption efficiency, improvement of a horizontal radiation property, etc.

In some embodiments, the radiator 122 and the first portion 124*a* of the transmission line 124 have the mesh-pattern structure, and the signal pad 126, the ground pad 128 and the second portion 124*b* of the transmission line 124 may have a solid metal structure.

The radiator 122 and the first portion 124*a* of the transmission line 124 may be disposed in the display area of the image display device, and the signal pad 126, the ground pad 128 and the second portion 124*b* of the transmission line 124 may be disposed in a non-display area or a bezel area of the image display device.

The above-described antenna structure may be disposed on the image display device to provide functions of a transparent film and an antenna. The support layer 100 may serve as a substrate for the antenna unit 120, and thus an additional base layer or a substrate for the antenna may not be inserted.

Accordingly, a total thickness of the image display device including the antenna structure may be reduced while maintaining the antenna radiation performance, so that flexible property and durability may be improved to provide the image display device including an antenna with high reliability.

If the additional and individual substrate layer for the antenna is inserted, a neutral layer for a folding of the image display device may be changed to result in an excessive stress at a weak portion of the image display device.

However, according to exemplary embodiments, the additional antenna substrate may not be inserted, so that the neutral layer of the image display device may be maintained. Thus, a stress applied to a weak portion at an inside of the image display device may be suppressed while maintaining an antenna radiation performance. Thus, the image display device including the antenna may be implemented with enhanced folding property and reliability.

Further, an additional film or layer may not be inserted in the display area, so that a luminance reduction of the image display device may be prevented.

Figure 3:
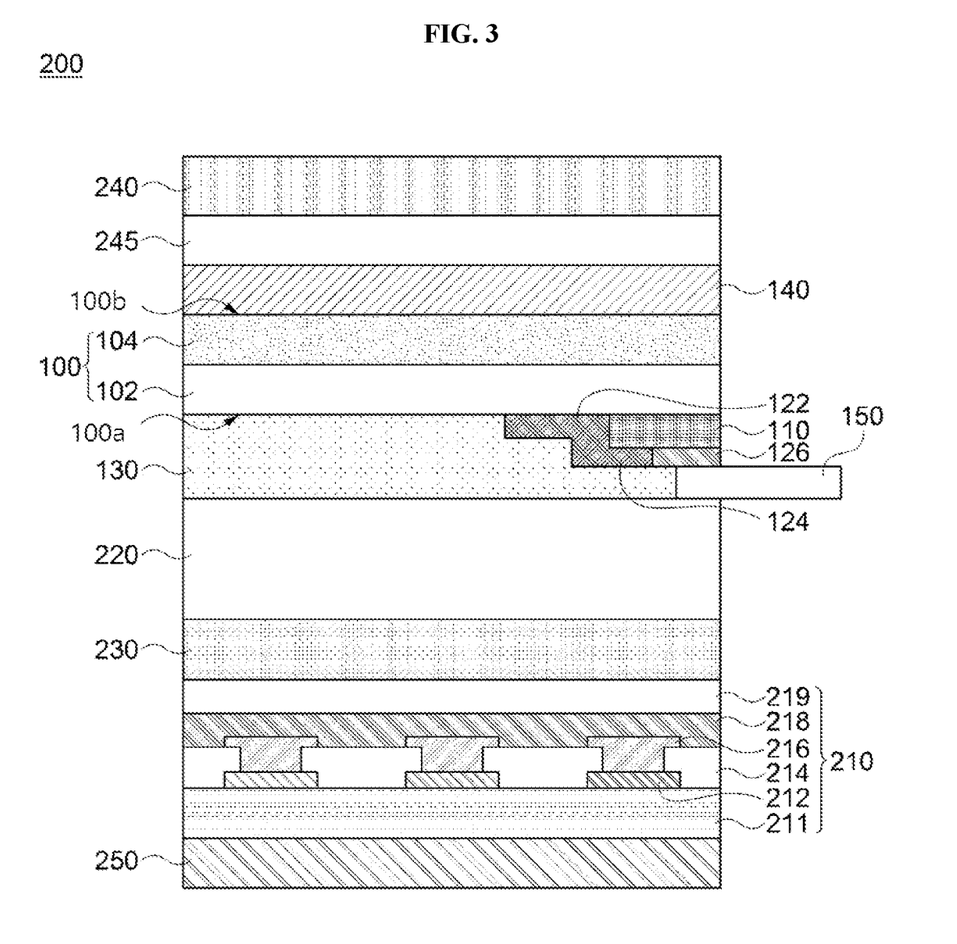
FIG. 3 is a schematic cross-sectional view illustrating an image display device in accordance with exemplary embodiments.

FIG. 3 is a schematic cross-sectional view illustrating an image display device in accordance with exemplary embodiments.

Referring to FIG. 3, the image display device 200 may include a display panel 210 and the above-described antenna structure disposed on the display panel 210. For example, the antenna structure may be stacked on the display panel 210.

The display panel 210 may include a pixel electrode 212, a pixel defining layer 214, a display layer 216, a counter electrode 218 and an encapsulation layer 219 disposed on a panel substrate 211.

A pixel circuit including a thin film transistor (TFT) may be formed on the panel substrate 211, and an insulating layer covering the pixel circuit may be formed. The pixel electrode 212 may be electrically connected to, e.g., a drain electrode of the TFT on the insulating layer.

The pixel defining layer 214 may be formed on the insulating layer to expose the pixel electrode 212 to define a pixel area. The display layer 216 may be formed on the pixel electrode 212, and the display layer 216 may include, e.g., a liquid crystal layer or an organic light emitting layer. Preferably, the display layer 216 may include the organic light emitting layer, and the display panel 210 may be an OLED panel.

The counter electrode 218 may be disposed on the pixel defining layer 214 and the display layer 216. The counter electrode 218 may serve as, e.g., a common electrode or a cathode of the image display device 200. The encapsulation layer 219 for protecting the display panel 210 may be stacked on the counter electrode 218.

In some embodiments, the conductive member included in the display panel 210 may serve as a ground for the antenna unit 120. The conductive member may include, e.g., a gate electrode of the TFT, various wirings such as, a scan line or a data line, or various electrodes such as the pixel electrode 212 and the counter electrode 218.

In an embodiment, various structures including a conductive material disposed under the display panel 210 may serve as an antenna ground. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the ground of the antenna unit 120.

In some embodiments, a ground layer 250 may be disposed under the display panel 210. In this case, the conductive member of the display panel 210 and the ground layer 250 may commonly serve as a ground of the radiator 122. Accordingly, a vertical radiation property from the radiator 122 may be implemented with high efficiency and reliability.

For example, the ground layer 250 may be disposed under the display panel 210 and may be provided as a metal plate, a pressure sensor, a fingerprint sensor, an electromagnetic wave shielding layer, a heat dissipation sheet or a digitizer.

For example, the ground layer 250 may include the above-mentioned metal or alloy.

In some embodiments, a cover window 240 may be disposed on the above-described antenna structure. For example, the second surface 100b of the support layer 100 of the antenna structure may be disposed toward or face the cover window 240. In this case, the second surface 100b of the support layer 100 may be closer to the cover window 240 than the first surface 100a.

For example, the cover window 240 may serve as a window cover, a cover glass, a protective cover film or a protective cover layer of the image display device. In this case, the cover window 240 may provide a viewing surface or an outermost surface to ae user of the image display device 200.

The cover window 240 may include, e.g., glass or a flexible resin material such as polyimide, polyethylene terephthalate, an acrylic resin, a siloxane-based resin, or the like.

In some embodiments, a first adhesive layer 220 may be disposed between the antenna structure and the display panel 210. The first adhesive layer 220 may include, e.g., a transparent resin film, an adhesive material or an inorganic insulating material that may be included in the above-described support layer 100.

For example, the first adhesive layer 220 may adhere the display panel 210 or an optical layer 230 to the antenna structure. In this case, the first adhesive layer 220 may include, e.g., a pressure-sensitive adhesive (PSA) or an optically transparent adhesive (OCA) including an acrylic resin, a silicone-based resin, an epoxy-based resin, etc.

In some embodiments, a second adhesive layer 245 may be disposed between the transparent film 140 of the antenna structure and the cover window 240. For example, the second adhesive layer 245 may include substantially the same material as that of the first adhesive layer 220.

For example, the transparent film 140 and the cover window 240 may be attached by the second adhesive layer 245.

For example, if a distance between the display panel 210 or the ground layer 250 and the antenna unit 120 is excessively small, an applied signal may not form an electric field in the radiator 122 and may be absorbed by the conductive member of the display panel 210 or the ground layer 250.

In some embodiments, a thickness of the first adhesive layer 220 may be from 50 μm to 500 μm, and a thickness of the second adhesive layer 245 may be from 20 μm to 200 μm.

Within the above range, improved flexible properties of the antenna structure or the image display apparatus 200 may be achieved while preventing a signal loss of the antenna unit 120 to provide sufficient radiation properties. Accordingly, the antenna structure or the image display device having improved signal efficiency, radiation properties and reliability may be obtained.

Additionally, the circuit board 150 may be disposed between the first adhesive layer 220 and the light-shielding pattern 110, so that a sufficient thickness of the first adhesive layer 220 may be achieved and the circuit board 150 may be stably fixed. Accordingly, the image display device 200 having enhanced durability and reliability may be implemented.

In some embodiments, the thickness of the first adhesive layer 220 may be greater than the thickness of the second adhesive layer 245.

In some embodiments, an optical layer 230 may be disposed between the first adhesive layer 220 and the display panel 210.

The optical layer 230 may be a polarizing layer including, e.g., a coating-type polarizer or a polarizing plate. The coating-type polarizer may include a liquid crystal coating layer including a polymerizable liquid crystal compound and a dichroic dye. In this case, the optical layer 230 may further include an alignment layer for providing an orientation to the liquid crystal coating layer.

For example, the polarizing plate may include a polyvinyl alcohol-based polarizer and a protective film attached to at least one surface of the polyvinyl alcohol-based polarizer.

Hereinafter, a method of manufacturing the image display device 200 according to exemplary embodiments is provided.

For example, a laminate that may include the support layer 100 including the first intermediate layer 102 and the second intermediate layer 104, and a carrier substrate adhered on the second surface 100b of the second intermediate layer 104 may be prepared. The carrier substrate may include, e.g., an inorganic insulating material such as glass.

For example, the light-shielding pattern 110 may be formed on a peripheral portion of the first surface 100a of the support layer 100.

A conductive layer including the above-described metal or alloy may be patterned on the first surface 100a of the support layer 100 and the light-shielding pattern 110 to form the antenna unit 120. For example, the radiator 122 may be formed at the same level as that of the light-shielding pattern 110, and the pads 126 and 128 may be formed on a top surface of the light-shielding pattern 110.

For example, the passivation layer 130 may be formed on a top surface of the antenna unit 120 and the first surface 100a of the support layer 100. For example, the passivation layer 130 may be formed, to cover the radiator 122 and at least partially expose a top surface of the signal pad 126.

Thereafter, the carrier substrate may be separated from the second intermediate layer 104, and the transparent film 140 may be attached to the second surface 100b of the second intermediate layer 104 to form the antenna structure.

For example, the signal pad 126 of the antenna unit 120 may be bonded to the circuit board 150.

In exemplary embodiments, the above-described antenna structure may be turned upside down and laminated on a stack of the first adhesive layer 220-optical layer 230-display panel 210.

Thereafter, the image display device 200 may be formed by laminating the second adhesive layer 245 and the cover window 240 on the transparent film 140.

Figure 4:
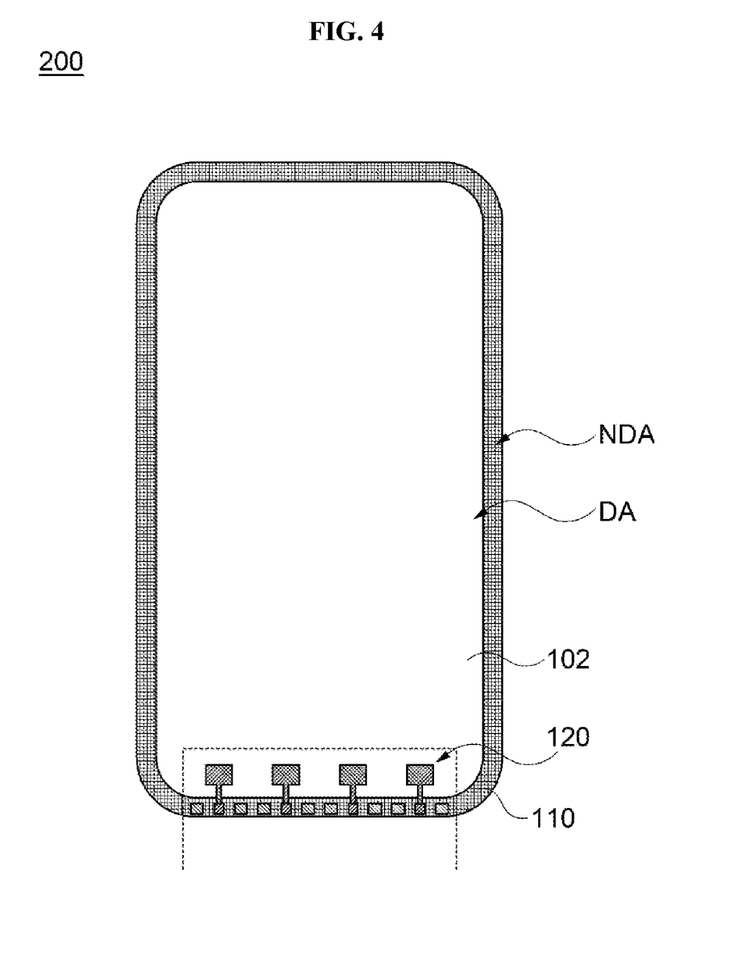
FIG. 4 is a schematic top planar view illustrating an image display device in accordance with exemplary embodiments.

FIG. 4 is a schematic top planar view illustrating an image display device in accordance with exemplary embodiments. In FIG. 4, the antenna unit 120 is enlarged than actual size of the antenna unit 120 for convenience of description.

Referring to FIG. 4, the image display device 200 may be fabricated in the form of, e.g., a smart phone, and FIG. 4 illustrates a front portion or a window surface of the image display device 200.

The front portion of the image display device 200 may include a display area DA and a non-display area NDA. The non-display area NDA may correspond to, e.g., a light-shielding portion or a bezel portion of the image display device.

The antenna unit 120 included in the above-described antenna structure may be disposed toward the front portion of the image display device 200.

In exemplary embodiments, the above-described antenna structure may be disposed on the display panel 210. In this case, the antenna unit 120 may be integrated with the image display device 200 without a separate antenna substrate layer. Accordingly, thickness and/or volume of the image display device 200 may be reduced, and thus bending property and durability of the image display device 200 may be improved.

In an embodiment, the radiator 122 and the first portions 124a of the transmission line 124 may at least partially disposed in the display area DA. In this case, the radiator 122 and the first portion 124a of the transmission line 124 may include a mesh-pattern structure to prevent a decrease in transmittance due to the radiator 122 and the first portion 124a of the transmission line 124 may be prevented.

The signal pad 126, the ground pad 128 and the second portion 124b of the transmission line 124 included in the antenna unit 120 may be formed as a solid metal pattern, and may be disposed in the non-display area NDA together with the light-shielding pattern 110 to prevent degradation of an image quality.

In some embodiments, the circuit board 150 may be bent and extended to a rear portion of the image display device 200, and may be electrically connected to a main board on which an antenna driving IC chip is mounted. Accordingly, feeding and antenna driving control to the antenna unit 120 through the antenna driving IC chip may be implemented.

As described above, the antenna unit 120 may be provided substantially integrally with the transparent film 140 without a separate antenna substrate layer. Thus, the thickness of the antenna structure and the image display device 200 may be reduced. Accordingly, the antenna structure and the image display device 200 having improved flexible properties and reliability may be provided.

What is claimed is:

1. An antenna structure comprising:
a support layer having a first surface and a second surface facing each other;
a light-shielding pattern disposed on a peripheral portion of the first surface of the support layer;
a radiator disposed at the same level as that of the light-shielding pattern on the first surface of the support layer
a signal pad disposed directly on the light-shielding pattern and electrically connected to the radiator; and
a transmission line electrically connecting the signal pad and the radiator with each other,
wherein a step difference is generated between a top surface of the signal pad and a top surface of the radiator,
wherein the transmission line is bent along a sidewall of the light-shielding pattern and the first surface of the support layer.

2. The antenna structure of claim 1, wherein the signal pad is in contact with a top surface of the light-shielding pattern, and the radiator is in contact with the first surface of the support layer.

3. The antenna structure of claim 1, further comprising a passivation layer formed on the first surface of the support layer to cover the radiator and at least partially expose a top surface of the signal pad.

4. The antenna structure of claim 1, wherein the radiator has a mesh structure, and the signal pad has a solid metal pattern.

5. The antenna structure of claim 1, further comprising a transparent film formed on the second surface of the support layer.

6. The antenna structure of claim 1, wherein the support layer comprises a first intermediate layer including the first surface and a second intermediate layer including the second surface; and
the first intermediate layer and the second intermediate layer include different dielectric materials.

7. An image display device comprising:
a display panel; and
the antenna structure according to claim 1 disposed on the display panel.

8. The image display device of claim 7, further comprising a ground layer disposed under the display panel.

9. The image display device of claim 7, further comprising a cover window disposed on the antenna structure,
wherein the second surface of the support layer of the antenna structure is disposed toward the cover window.

10. The image display device of claim 9, further comprising:
a first adhesive layer disposed between the antenna structure and the display panel; and
a circuit board disposed between the light-shielding pattern of the antenna structure and the first adhesive layer to be bonded to the signal pad.

11. The image display device of claim 10, further comprising a second adhesive layer disposed between the antenna structure and the cover window.

12. The image display device of claim 11, wherein a thickness of the first adhesive layer is from 50 μm to 500 μm, and a thickness of the second adhesive layer is from 20 μm to 200 μm.

13. The image display device of claim 10, further comprising an optical layer disposed between the first adhesive layer and the display panel.

\* \* \* \* \*